US012515813B2

(12) United States Patent
Senior

(10) Patent No.: US 12,515,813 B2
(45) Date of Patent: Jan. 6, 2026

(54) ADJUSTABLE STAIRWAY

(71) Applicant: CALIBRE ENTERPRISES LIMITED, Onekawa Napier (NZ)

(72) Inventor: Bruce Joseph Senior, Greenmeadows Napier (NZ)

(73) Assignee: CALIBRE ENTERPRISES LIMITED, Onekawa Napier (NZ)

(*) Notice: Subject to any disclaimer, the term of this patent is extended or adjusted under 35 U.S.C. 154(b) by 783 days.

(21) Appl. No.: 17/867,518

(22) Filed: Jul. 18, 2022

(65) Prior Publication Data

US 2022/0348357 A1 Nov. 3, 2022

Related U.S. Application Data

(63) Continuation of application No. PCT/NZ2021/050005, filed on Jan. 20, 2021.

(30) Foreign Application Priority Data

Jan. 21, 2020 (NZ) ........................................ 761013

(51) Int. Cl.
*B64F 1/31* (2006.01)
*B64F 1/315* (2006.01)

(52) U.S. Cl.
CPC .................................... *B64F 1/315* (2013.01)

(58) Field of Classification Search
CPC ............................... B64F 1/315; B66B 9/0869
See application file for complete search history.

(56) References Cited

U.S. PATENT DOCUMENTS 4,100,995 A * 7/1978 Pradon .................... E04F 11/06 182/1
5,907,935 A * 6/1999 Elena .................... E04F 11/035 52/182
9,091,083 B1 * 7/2015 Goudreau ............ E04F 11/066

FOREIGN PATENT DOCUMENTS

KR 20160085142 A 7/2016
WO WO-2012118386 A1 * 9/2012 .............. B64F 1/315

OTHER PUBLICATIONS

PCT Search Report for Application No. PCT/NZ202 I/050005, mailed Mar. 9, 2021, 9 pages.

* cited by examiner

*Primary Examiner* — Justin M Benedik
(74) *Attorney, Agent, or Firm* — Dinsmore & Shohl LLP

(57) ABSTRACT

Certain aspects of the present disclosure provide techniques for a mobile adjustable stairway which has a first frame section which is adapted to be mobile and has fixed steps and a second frame section coupled to the first frame section such that relative movement there between can take place whereby the stairway is adjustable between a compacted form and an extended form. A set of floating steps is provided whereby each floating step is adapted to be progressively raised and lowered as the stairway as the second frame section is moved relative to the first frame section between the compacted and extended forms. The stairway also has a set of first components associated with each floating step operable to laterally stabilize the floating step when in the extended form; and a set of second components associated with each floating step operable to longitudinally stabilize the floating step when in the extended form.

16 Claims, 7 Drawing Sheets

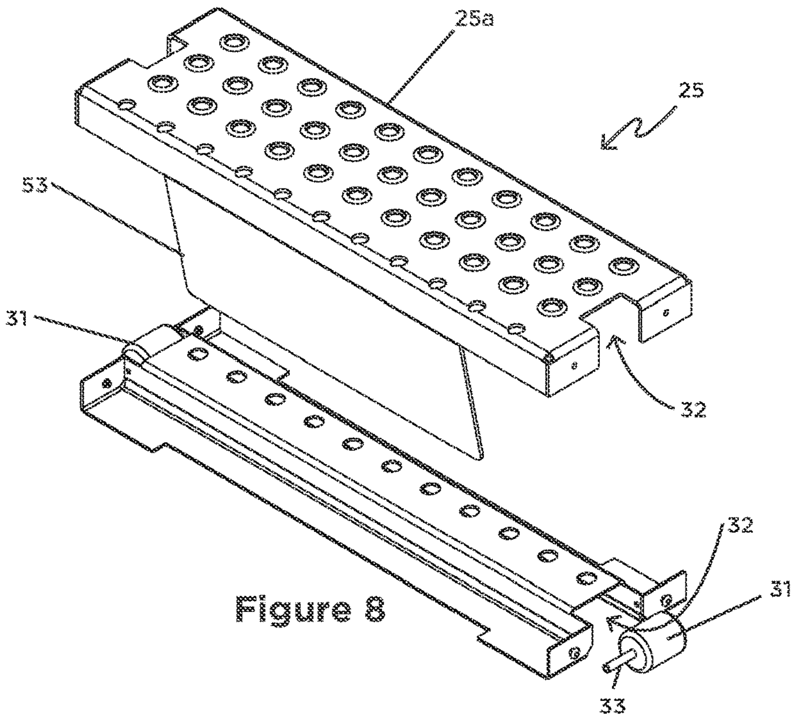
Figure 8
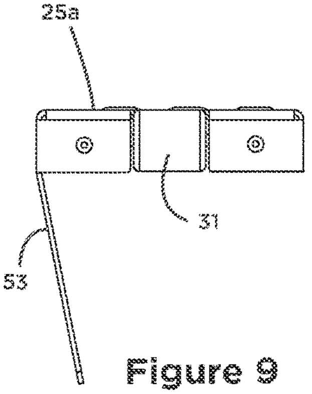
Figure 9
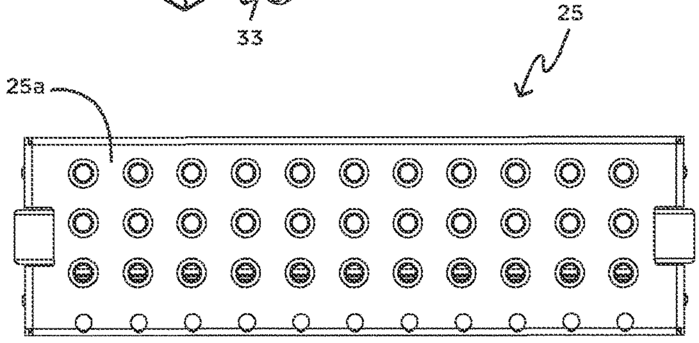
Figure 10
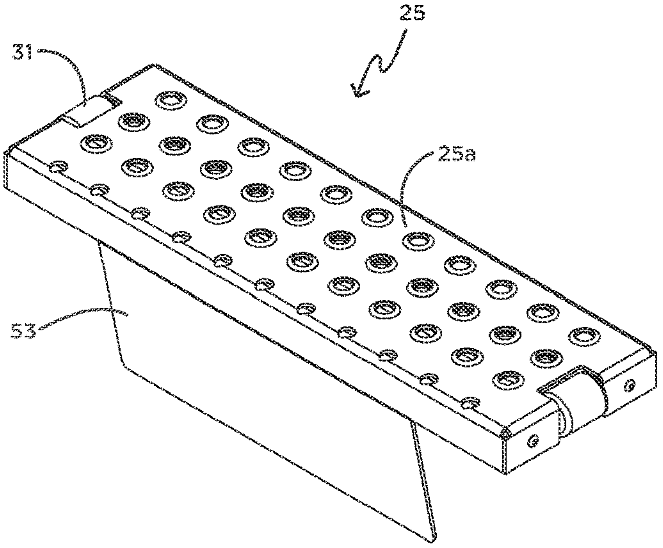
Figure 11
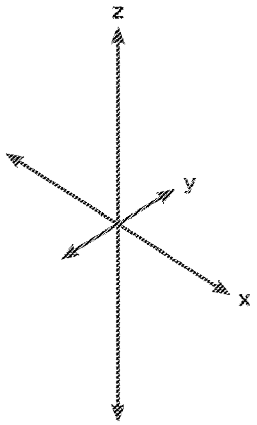

ADJUSTABLE STAIRWAY

CROSS-REFERENCE TO RELATED APPLICATION

This application is a continuation of PCT Application No. PCT/NZ2021/050005, filed Jan. 20, 2021, for "Improved Adjustable Stairway," which claims priority to NZ Patent Application No. 761013, filed on Jan. 21, 2020, for "Improved Adjustable Stairway," both of which are hereby incorporated by reference in their entirety.

INTRODUCTION

The invention generally relates to an improved adjustable stairway and in particular relates to an improved mechanism for alignment of steps in an adjustable stairway and associated components and mechanisms.

Situations exist where access height above level ground is desired to gain access to machinery, equipment, vehicles and the like in order for a person to carry out tasks on the machinery etc. These situations usually arise where large equipment, machinery and vehicles are involved. Consequently, ladders, stairways and like access equipment is often required to gain the necessary access.

For example in the mining industry the nature and sheer size of the equipment, vehicles and machinery requires a vast array of ladders and stairways for workers to gain the necessary access. Not only does the array of ladders and stairways represent a cost to the mining operation but also presents efficiency and ergonomic issues for the user, as well as a problem with storage when the ladders/stairways are not in use. Transporting a multitude of ladders and stairways can also present a problem.

Another example is the aviation industry where different sized aircraft need to be worked on. Once again a variety of stairways and ladders need to be available to accommodate the different sizes of aircraft.

Applicant's own earlier Australian patent 2012223754 reports an adjustable stairway which has a first frame section with fixed steps and a second frame section coupled to the first frame section. Relative movement can take place between the sections such that the stairway is adjustable between a compacted form and an extended form. The second frame has floating steps whereby the floating steps are progressively raised and lowered as the stairway is moved between the extended and compacted forms. To control movement of the floating steps, a conical locating device is configured to engage with an abutment on the floating steps such that the floating steps are stabilized about the conical locating device.

However, the Applicant has noted the conical locating device has a disadvantage in that the floating steps, which by nature have some misalignment with the conical locating device, are prone to binding or jamming when engaging with the conical locating device. Therefore, it would be an advantage to have improvements in the field of floating steps to overcome such issues.

It is an object of the invention to go at least some way toward overcoming or at least ameliorating the above mentioned problem, or which at least provides the public with a useful choice.

In this specification, where reference has been made to external sources of information, including patent specifications and other documents, this is generally for the purpose of providing a context for discussing the features of the present invention. Unless stated otherwise, reference to such sources of information is not to be construed, in any jurisdiction, as an admission that such sources of information are prior art or form part of the common general knowledge in the art.

SUMMARY

In a first broad aspect the invention consists in a mobile adjustable stairway apparatus comprising: a first frame section which is adapted to be mobile and has fixed steps; a second frame section coupled to the first frame section such that relative movement there between can take place whereby the stairway is adjustable between a compacted form and an extended form; one or more floating steps, whereby the floating steps are adapted to be progressively raised and lowered as the stairway is moved between the extended and compacted forms; and wherein the stairway further comprises: a plurality of first components adapted to engage between at least one of the one or more floating steps and the second frame section and operable to laterally stabilize the floating step when in the extended form; and a plurality of second components adapted to engage between at least one of the one or more floating steps and the second frame section and operable to longitudinally stabilize the floating step when in the extended form.

In another broad aspect the invention consists in a mobile adjustable stairway apparatus comprising: a first frame section which is adapted to be mobile and has fixed steps; a second frame section coupled to the first frame section such that relative movement there between can take place whereby the stairway is adjustable between a compacted form and an extended form; a set of floating steps, whereby each floating step is adapted to be progressively raised and lowered as the stairway as the second frame section is moved relative to the first frame section between the compacted and extended forms; and wherein the stairway further comprises: a set of first components associated with each floating step operable to laterally stabilize the floating step when in the extended form; and a set of second components associated with each floating step operable to longitudinally stabilize the floating step when in the extended form. In some embodiments, the second component is further operable to vertically stabilize the floating step when in the extended form.

In some embodiments, the stairway further comprises a plurality of third components fixed, relative to the first frame section, and adapted to engage between at least one of the one or more floating steps and the second frame section and operable to longitudinally stabilize the floating step when in the compacted form.

In some embodiments, the second component and the third component are laterally offset, one more in-board than the other, and longitudinally coexist such that vertical displacement of the second component relative to the third component is facilitated.

In some embodiments, the one or more floating steps comprise at least one laterally orientated recess disposed on the underside thereof, the recess adapted for engagement with at least the second component.

In some embodiments, the first component comprises a pair of rollers, the rollers fixed to opposing lateral ends of a floating step and adapted to engage with the second frame section such that vertical movement is permitted, and lateral movement is substantially inhibited relative to the second frame section.

In some embodiments, the second component comprises: a first surface aligned on a first plane so as to define a vertically facing surface adapted to engage with and vertically support a floating step when in the extended form; and a second surface aligned on a second plane so as to define a longitudinally facing surface adapted to engage with and longitudinally support a floating step when in the extended form. In some embodiments, the second surface of the second component comprises a lead-in contour such that misalignment with a floating step is tolerable.

In some embodiments, the third component comprises: a first surface aligned on a first plane so as to define a vertically facing surface adapted to engage with and vertically support a floating step when in the extended form; and a second surface aligned on a second plane so as to define a longitudinally facing surface adapted to engage with and longitudinally support a floating step when in the compacted form.

In some embodiments, the second surface of the third component comprises a lead-in contour such that misalignment with a floating step is tolerable.

In some embodiments, the recess in the one or more floating steps comprises a lead-in contour such that misalignment with the second component and/or third component is tolerable.

In some embodiments, the plurality of third components are positioned such that when the floating steps are engaged therewith, the floating steps form a substantially flat tread surface.

In some embodiments, the plurality of second components are positioned in opposing pairs, each pair vertically displaced from another pair such that when the floating steps are engaged therewith, the floating steps form a staircase.

In some embodiments, the stairway includes a device operable to adjustably cause the relative movement of the first and second frame sections to occur.

In some embodiments, the device is a linear actuator for creating controlled adjustment of the stairway between the compacted and extended forms.

The following embodiments may relate to any of the above aspects. Other aspects of the invention may become apparent from the following description which is given by way of example only and with reference to the accompanying drawings.

As used herein the term “and/or” means “and” or “or”, or both.

As used herein “(s)” following a noun means the plural and/or singular forms of the noun.

The term “comprising” as used in this specification means “consisting at least in part of”. When interpreting statements in this specification which include that term, the features, prefaced by that term in each statement or claim, all need to be present but other features can also be present. Related terms such as “comprise” and “comprised” are to be interpreted in the same manner.

This invention may also be said broadly to consist in the parts, elements and features referred to or indicated in the specification of the application, individually or collectively, and any or all combinations of any two or more of said parts, elements or features, and where specific integers are mentioned herein which have known equivalents in the art to which this invention relates, such known equivalents are deemed to be incorporated herein as if individually set forth.

To those skilled in the art to which the invention relates, many changes in construction and widely differing embodiments and applications of the invention will suggest themselves without departing from the scope of the invention as defined in the appended claims. The disclosures and the descriptions herein are purely illustrative and are not intended to be in any sense limiting.

DESCRIPTION OF THE DRAWINGS

In the following more detailed description of embodiments of an adjustable stairway incorporating the present invention reference will be made to the accompanying drawings in which:

FIG. 8 shows an exploded isometric view of components of a preferred step;

FIG. 9 shows an end view of the step of FIG. 8;

FIG. 10 shows a top view of the step of FIGS. 8 and 9;

FIG. 11 shows an assembled isometric view of the step of FIGS. 8 to 10 with a reference plane indication;

DETAILED DESCRIPTION

Figure 1:
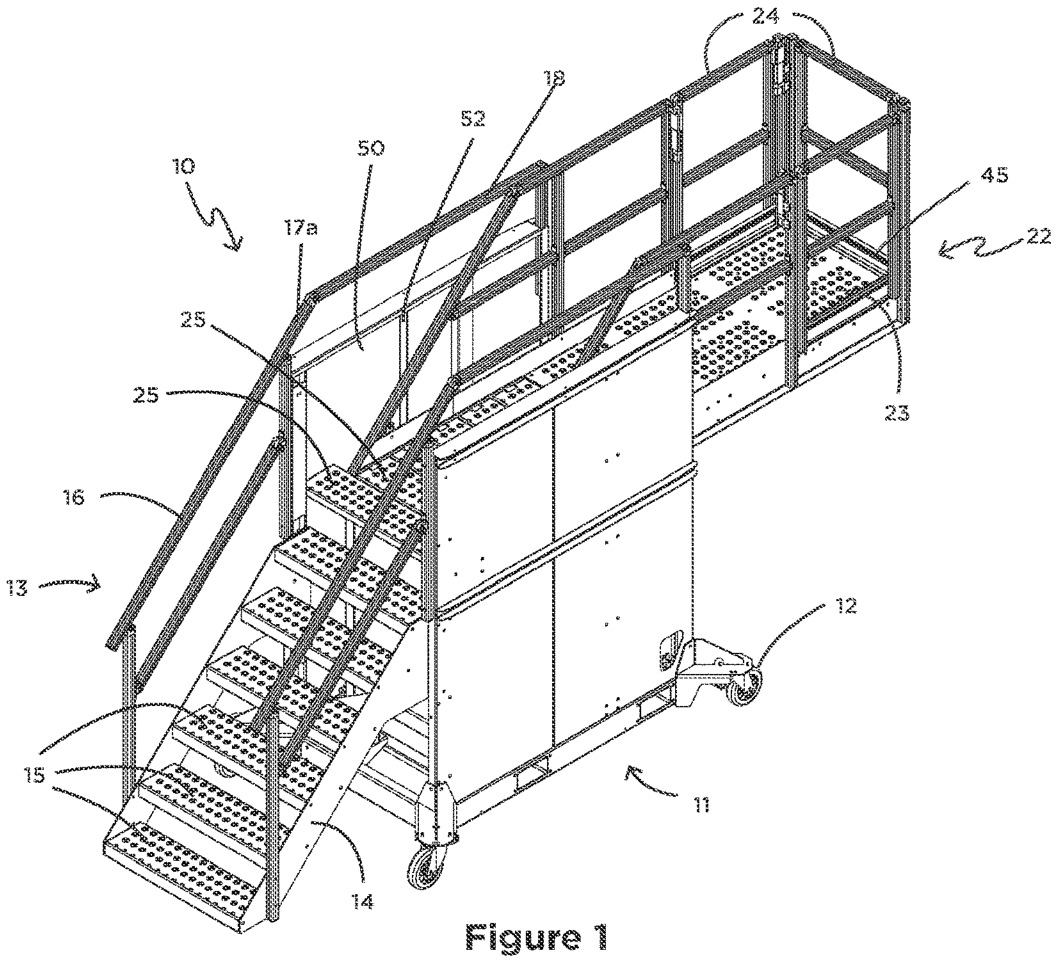
FIG. 1 shows an isometric view of the adjustable stairway when in its fully lowered or compacted configuration.

In the drawings, there are shown embodiments of a stairway incorporating the invention. It will be appreciated by the skilled addressee that a stairway incorporating the invention can be achieved by way of embodiments, which differ from that which is described and illustrated in the present specification.

Figure 2:
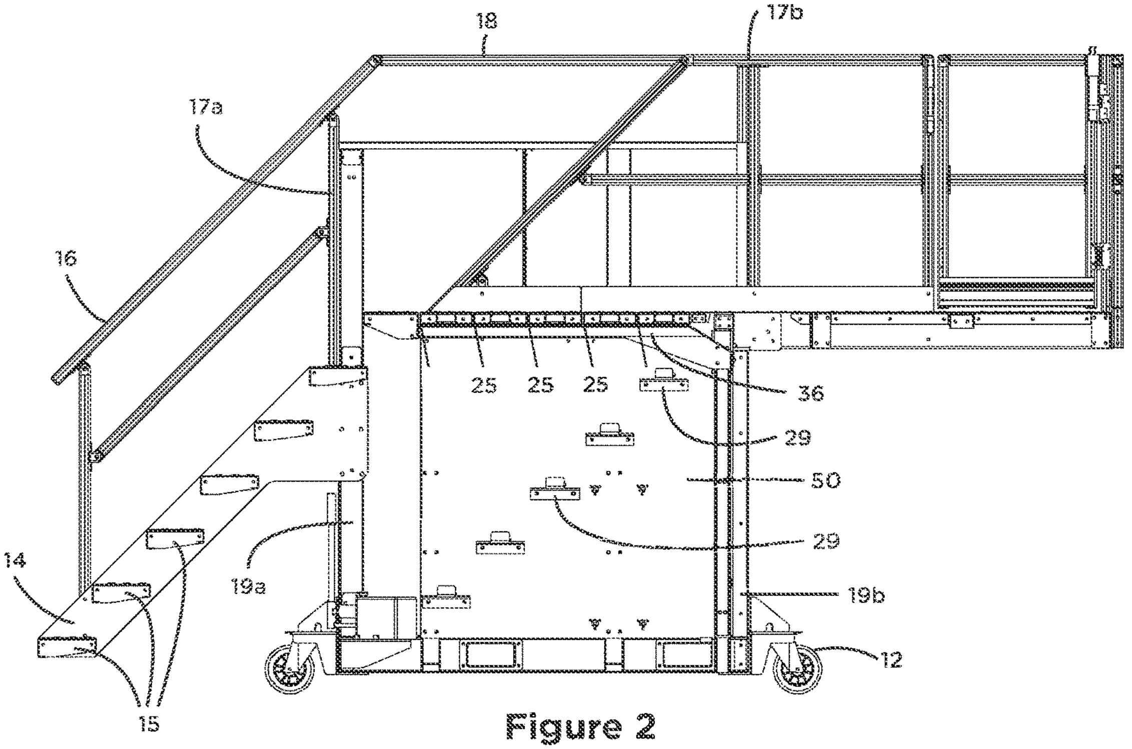
FIG. 2 shows a side cross sectional view of a collapsed or non-extended configuration of an exemplary stairway of FIG. 1.
Figure 3:
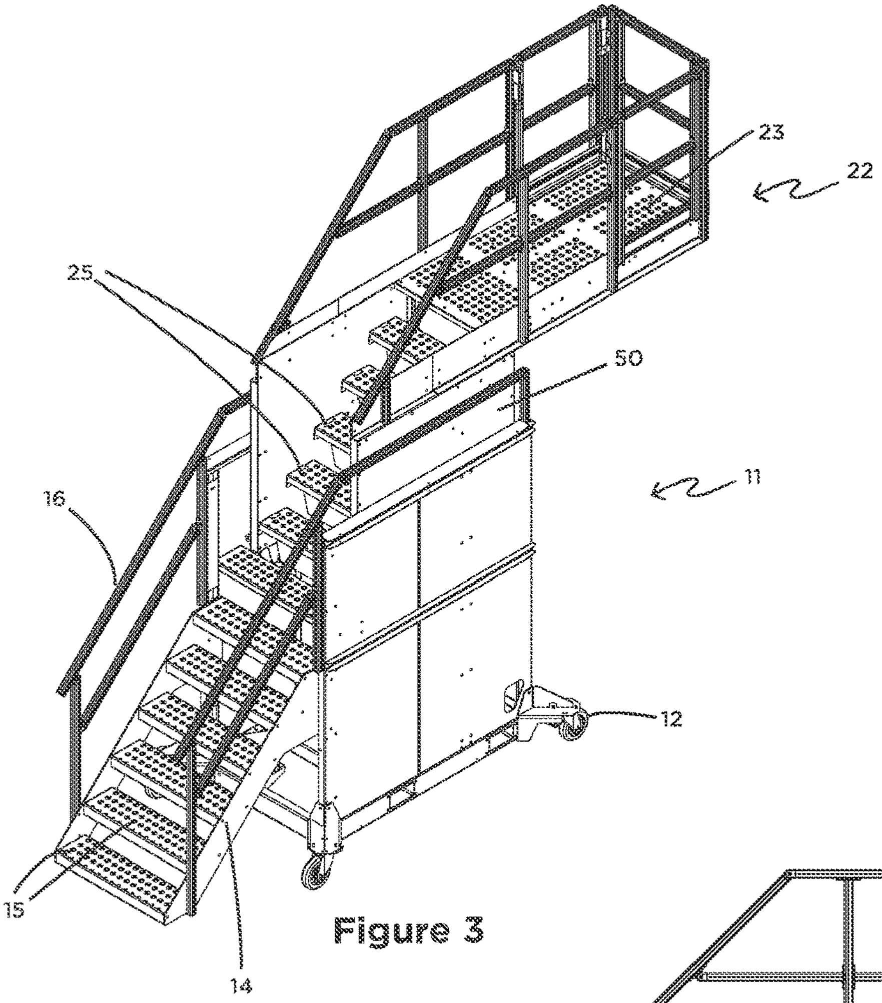
FIG. 3 shows an isometric view of the stairway in an extended configuration of the exemplary stairway.
Figure 4:
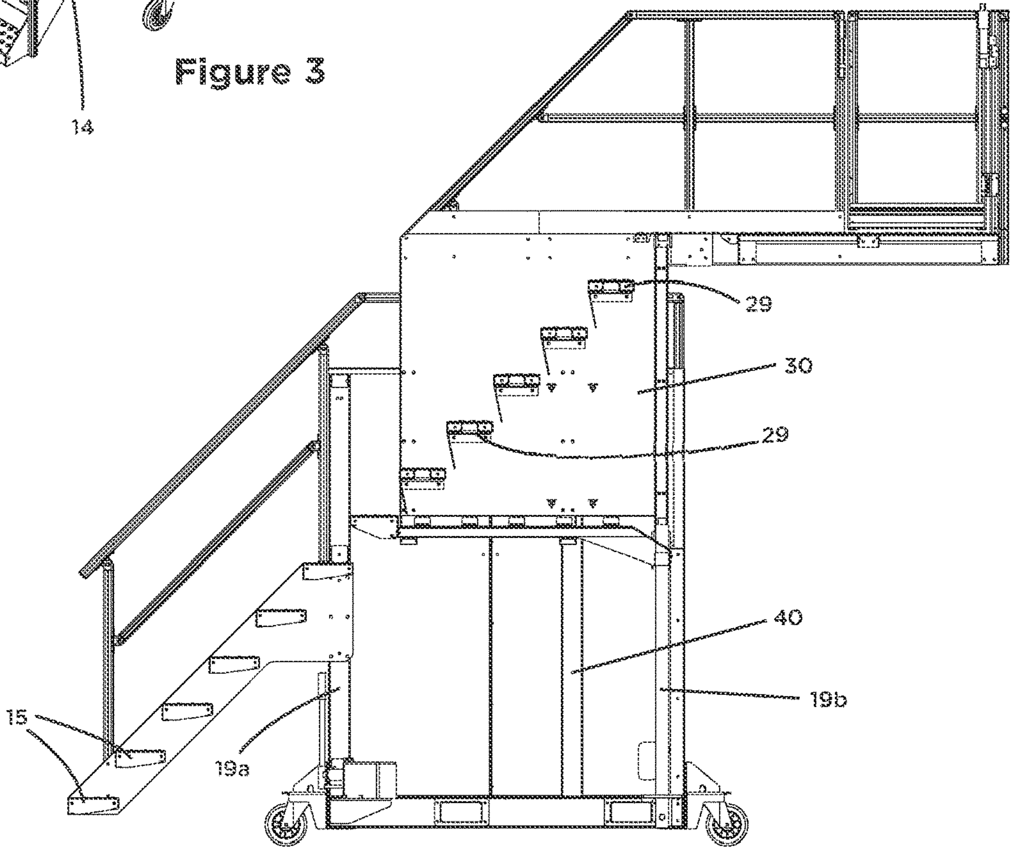
FIG. 4 a side cross sectional view of an extended configuration of the exemplary stairway of FIG. 3.
Figure 5:
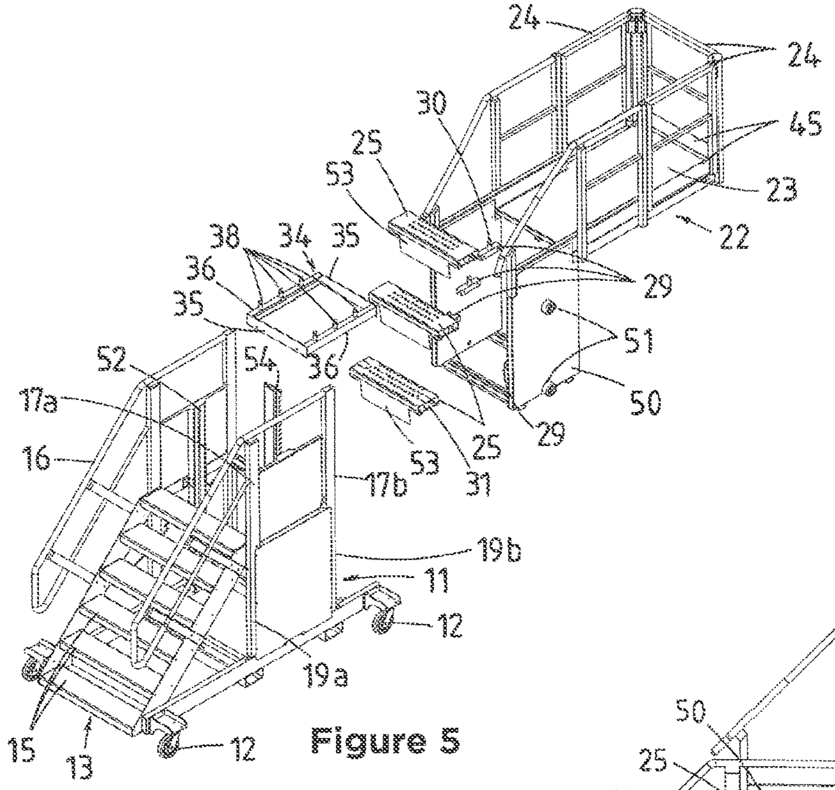
FIG. 5 shows an exploded view of an exemplary stairway in the extended configuration.
Figure 6:
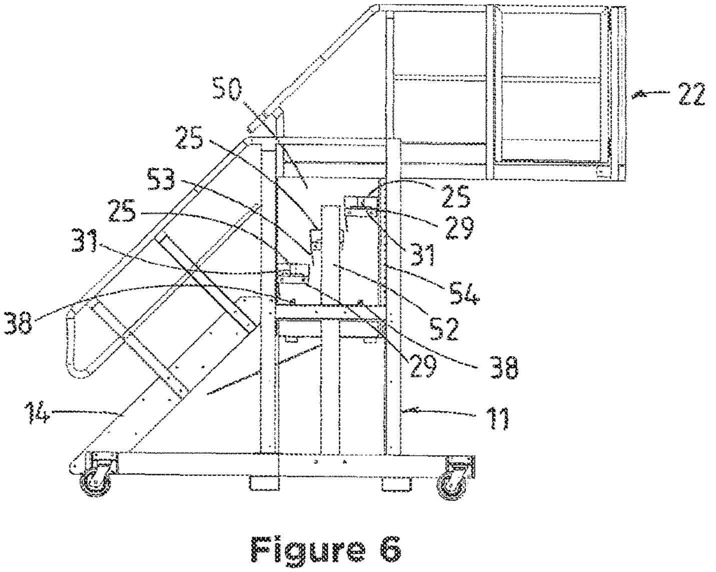
FIG. 6 shows a side view of one embodiment of a stairway with sidewalls removed to show an extension mechanism.
Figure 7:
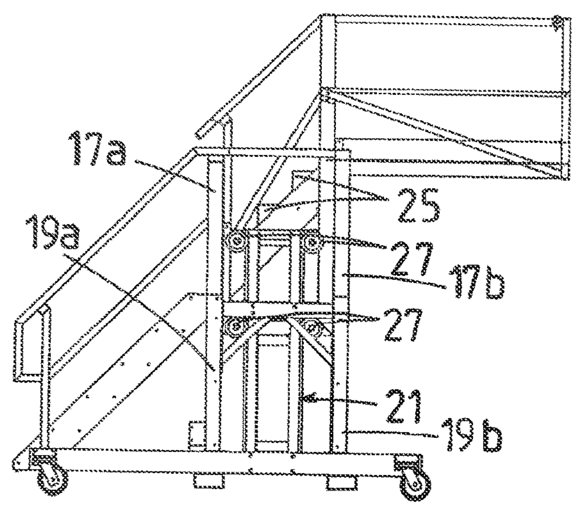
FIG. 7 shows side view of another embodiment of a stairway with sidewalls removed to show an extension mechanism.

FIGS. 1 to 7 illustrate exemplary embodiments of a stairway operable to realize the advantages of the invention. In particular, FIG. 1 shows an isometric view and FIG. 2 a side cross sectional view of a collapsed or non-extended configuration of a first exemplary stairway. FIG. 3 shows an isometric view and FIG. 4 a side cross sectional view of an extended configuration of the exemplary stairway shown by earlier Figures. FIG. 5 shows an exploded view of another exemplary stairway which is in the extended configuration. FIG. 6 shows a side view of one embodiment of an exemplary stairway with sidewalls removed to show an extension mechanism which is adapted to raise and lower sections of the stairway. FIG. 7 shows side view of another embodiment of a stairway with sidewalls removed to show another form of the extension mechanism which is also adapted to raise and lower sections of the stairway.

FIGS. 8 to 18 illustrate components of the stairway. In particular, FIG. 8 shows an exploded isometric view of components of a preferred step. FIG. 9 shows an end view of the step, FIG. 10 shows a top view of the step, and FIG. 11 shows an assembled isometric view of the step with a reference plane indication. The exemplary step depicted is one form of a step which may operate with the components described in this specification. It is further notable that the preferred form of the step is one which is adapted to engage with a first stabilizing component on one axis, and a second stabilizing component on two further axes.

Figure 12:
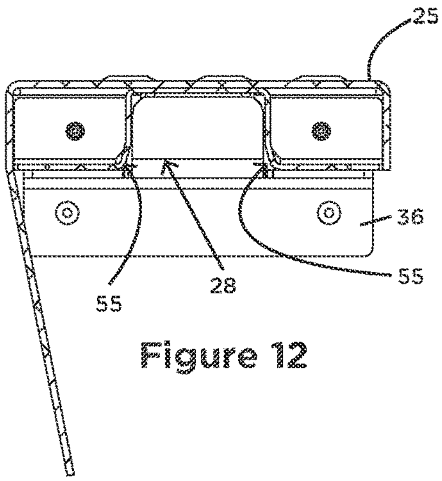
FIG. 12 shows the step with one tread or step support bracket shown engaging the underside of the step.
Figure 13:
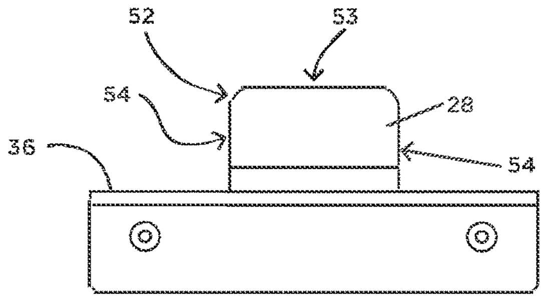
FIG. 13 shows the support bracket alone of a first frame section.
Figure 14:
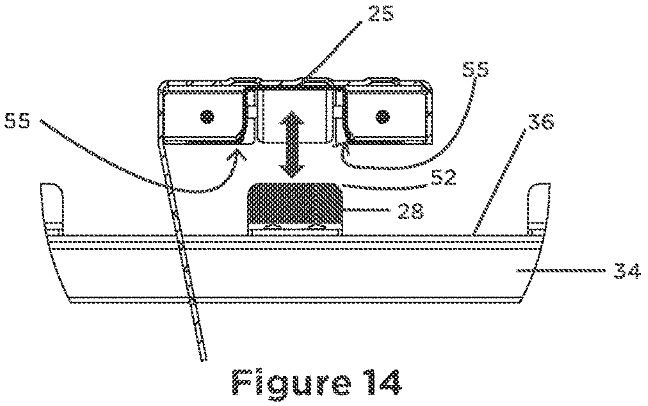
FIG. 14 illustrates the bracket of FIG. 13 and the step of FIGS. 8 to 11 with a reference arrow provided to indicate a direction of engagement.
Figure 15:
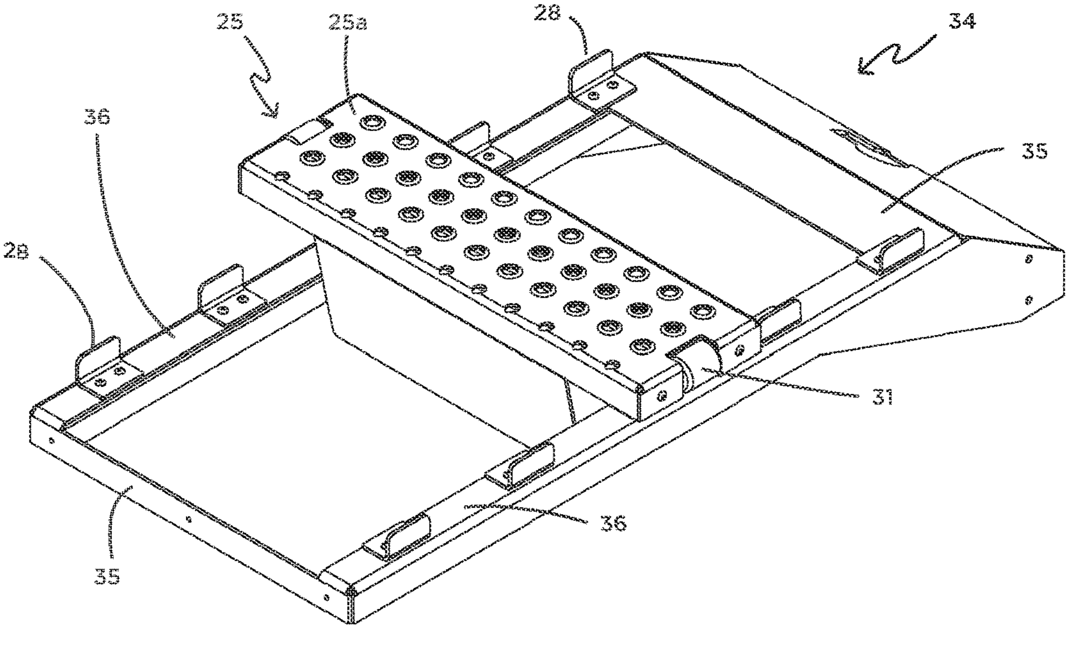
FIG. 15 shows a step of FIGS. 8 to 11 residing above a step support structure.

FIG. 12 shows the step with one tread or step support bracket shown engaging the underside of the step, and FIG. 13 shows the bracket alone. FIG. 14 illustrates the bracket and step with a reference arrow provided to indicate a direction of engagement. FIG. 15 shows a step residing above a step support structure.

Figure 16:
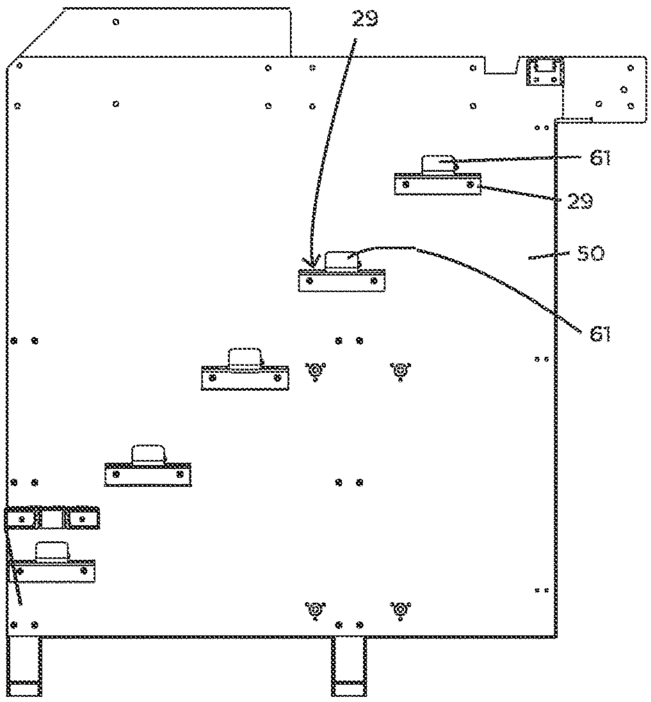
FIG. 16 shows a side cross-sectional view of an extension structure of the second frame section which is adapted to pick up floating steps in the extended form.
Figure 17:
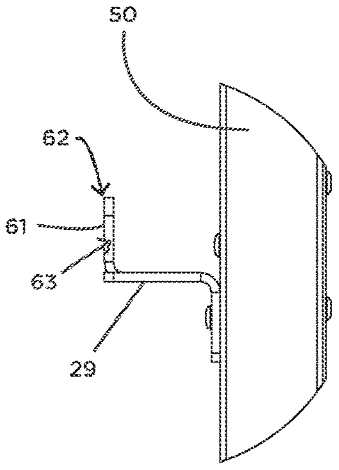
FIG. 17 shows an end view of the step support bracket attached to the extension structure of FIG. 16.
Figure 18:
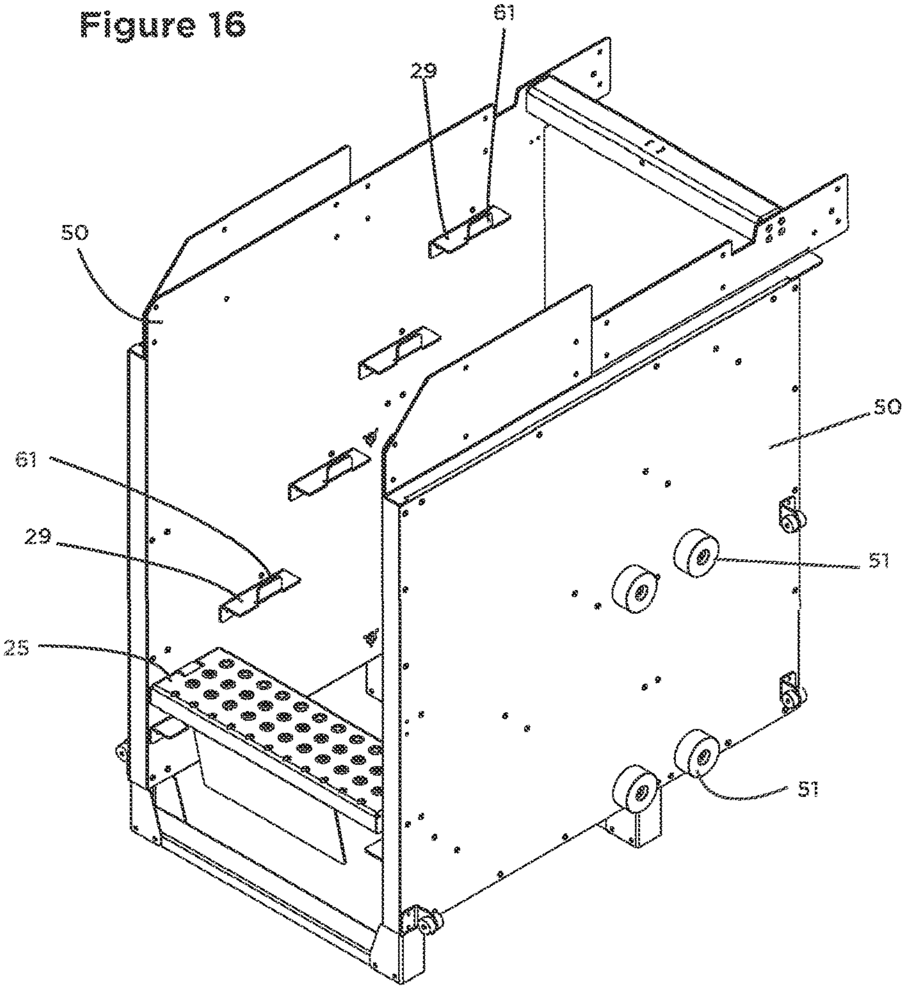
FIG. 18 shows an isometric view of the extension structure including step support brackets.

FIG. 16 shows a side cross-sectional view of an extension structure adapted to pick up steps in the extended form. FIG. 17 shows an end view of the step support bracket attached to the extension structure of FIG. 16. FIG. 18 shows an isometric view of the extension structure including step support brackets.

Referring to FIGS. 1 to 5, exemplary embodiments of a stairway 10 is shown. The exemplary embodiments depicted herein show an improvement over Applicant's own former technology as reported by Australian patent 2012223754, the entirety of which is incorporated by reference.

The stairway 10 includes a first frame section 11 and second frame section 22. The embodiment of the invention depicted is one which is intended to be mobile thus the first frame section is provided with wheels 12. The first frame section 11 is constructed so as to provide a sturdy and stable base for a stairway and includes a stairway section comprising steps or treads supported by sidewalls. In the illustrated embodiments there are six or seven fixed steps on the first frame section, but the skilled person will appreciate that the number of steps can vary depending on the intended end use of the stairway.

The stairway 10 further includes a number of floating step 25. The floating steps 25 are adapted to be successively and selectively lifted by a substructure which includes support walls 50 so as to extend the number of steps. When any of the floating steps are not lifted, they are supported by a substantially planar subframe 36 so as to extend a platform landing deck surface 23.

The first frame section 11 includes a stairway section 13 comprising stair side members 14 and fixed in place steps or treads 15 extending therebetween. In the embodiment depicted, a handrail rail 16 is shown to supplement use of the steps. The handrail 16 joins with an upright member 17*a*. An extension 18 of the handrail extends from the upright 17*a* to a second upright member 17*b*, which is spaced from, but parallel to, the upright member 17*a*. The uprights 17*a* and 17*b* extend from lower frame vertical members 19*a* and 19*b* respectively.

The second frame section 22 is mounted to the first frame 11 so as to be movable relative thereto. To facilitate such movement, side plates 50 are mounted to the second frame section 22 and the plates may be stabilized by a number of mechanisms. For example, FIG. 6 shows a mechanism employing a vertical guide shaft about which a subframe is raised and lowered, and FIG. 7 shows a number of guide rails whereby a subframe is located to locate on the rails. A linear actuator 40 is provided to achieve upward and downward adjustment of the position of the second frame section 22 relative to the first frame section 11. In the preferred form the actuator is hydraulically powered. An electric powered pump, compressed air, powered pump or hand pump can act to operate the linear actuator 40. The linear actuator 40 is, in the illustrated form, mounted to the first frame section 11 while the piston rod is attached to the second frame section 22.

In the embodiments depicted by FIGS. 6 and 7, the inward facing edges of the upright pairs 17*a* and 19*a* and 17*b* and 19*b* incorporate, or are provided with, a surface which rollers engage as will hereinafter be described. FIG. 7 shows one implementation of a mechanism adapted to lift steps 25 whereby a sub frame 21 is mounted between the upright pairs 17*a*/19*a* and 17*b*/19*b* and fixed in place on the first frame 11. This sub frame 21 also has surfaces 21 with which rollers 27 can engage. The roller engaging surfaces 21 are spaced apart so that rollers 27 can movably engage there between.

Referring to FIG. 6, an alternative lifting mechanism is shown where rollers or followers 51 are mounted to the side plates 50. These rollers 27 or followers 51 slidingly engage in a substantially vertically orientated guide 52 mounted to the first frame section 11. This guide 52 is generally of a channel or like section within which the rollers or followers 51, track during the stairway being moved between the fully extended or compacted configurations. FIG. 6 further depicts a toothed rack 54 that forms part of an optional safety device to provide a physical stop against accidental lowering.

Referring to FIG. 7, the second frame section 22 has mounted thereto a part that is constructed to engage within the area of the first frame section 11 that includes the uprights 17*a*/19*a* and 17*b*/19*b* and to be movable up and down therein. Pluralities of rollers 27 are attached to this part 26 as is shown in FIG. 6. The space between the opposing surfaces 50 form a space within which the rollers 27 can move. The rollers 27 are V groove rollers and only run on surfaces 21. The surface 21 has an inverted angle attached (welded) to it to match the V groove on the rollers.

Consequently the second frame section 22 can be moved and located in any position from a fully lowered position to a fully raised position.

The second frame section 22 includes the platform landing deck surface 23 about which extends a guard/handrail construction 24. The second frame section 22 also includes the number of plurality of floating steps 25. The second frame section 22 can have sidewalls 50, which form the sides of a stairway, which incorporates the floating steps 25. The landing deck is vertically positioned by raising and lowering of the second frame section 22, such as to align with the doorway of an aircraft or other machinery.

FIGS. 8 to 11 show detailed views of an exemplary floating step 25. Each floating step 25 has an upper surface 25*a* which provides a walking surface. The floating steps 25 may also optionally include the downward orientated kick plate 53. The kick plate advantageously prevents the foot of a person using the stairway from getting their foot caught under the floating step 25.

Furthermore, each step 25 includes a moveable guide on each opposing lateral side. In preferred forms, the lateral guide is a roller 31 as depicted in the drawings. In exemplary embodiments, the roller pivots on a shaft 33. The shaft is mounted to the opposing ends of the step 25, and acts to allow each roller to rotate about each respective shaft. In the exemplary embodiment shown, the rollers 31 and shafts 33 reside within a recess in opposing lateral regions of the step 25. However, other positions are possible.

Each opposing roller 31 on each step 25 acts to laterally stabilize the step. In this way, vertical movement of the step is permitted, via the second frame section 22 being raised and lowered while the step is laterally stabilized by engagement of the roller with the sidewall 50 of the second frame section 22.

Each floating step 25 also has a recess 32 located on the lower surface. The recess is adapted to engage with guiding surfaces described in further detail below. In some embodiments, the recess has a lead-in curvature such that some misalignment with any guiding surface is tolerable. In exemplary embodiments, the rollers 31 reside within the recess.

Those skilled in the art will appreciate that lateral stability may be provided by other similar mechanism which provide lateral stability but which do not inhibit vertical movement.

For example, low friction blocks or bushes, such as glide blocks, may be implemented in place of the depicted rollers. In such implementations, the glide blocks would comprise a low friction surface orientated to face, engage with, and slide against the sidewall 50 of the second frame section to substantially inhibit lateral movement of the step.

Referring to FIG. 11 and with reference to the X, Y, and Z planes shown, the rollers act to stabilize the step in the X plane by engagement with the second frame section 22, while not inhibiting movement of the step in the Y and Z planes. Instead, the steps 25 are stabilized in the Y and Z planes by another harmonious structure described below. The X, Y, and Z planes shown are herein respectively referred to as the lateral, longitudinal and vertical planes.

Referring to FIGS. 12 to 15, a frame which engages with and supports the floating steps in the lowered position is shown. FIG. 13 shows a side view of the support 28 positioned on the side rail 36 and FIG. 12 shows the support 28 engaged with the underside of the floating step 25. FIG. 14 shows the relative alignment of a floating step 25 with the support 28. FIG. 15 shows a detailed view of a subframe 34 which is configured to support any of the floating steps which have not been raised.

The subframe 34 aligns floating steps into a planar alignment when they are not lifted by the second frame section 22. In this way, the floating steps provide a planer surface and are stabilized by a combination of the rollers 31 engaging and bracing against the sidewalls 50 of the second frame section 22 to provide lateral stability, and the supports 28 engaging with the floating steps to provide vertical and forward to back stability to the step.

The first frame section 11 includes a support that is in the form of a substantially rectangular subframe 34 that has end members 35 and side members 36. This subframe 34 supports all the floating steps 25 when the second frame section 22 is in the fully lowered position, or one or more of the floating steps 25 when the second frame section 22 is raised but not to its full extension. In particular, the side members are configured such that the floating steps 25 rest on the top surface thereof and span between the opposing side members 36.

In preferred forms, the subframe 34 is attached to the first frame section, such that it is fixed in position, and extends into the gap between the sidewalls 50 of the second frame section which is not fixed in position. In this way, the second frame section is operable to move about the subframe 34 of the first frame section. Notable is the subframe is adapted to support the floating steps when in the compacted position, and the second frame section 22 adapted to pick up floating steps to transition to an extended position.

The subframe 34 has floating step support guides 28 attached to the side members 36. In some embodiments, the support guides 28 are in the form of flanges having an upward facing edge which engages with and guides a floating step 25, and preferably engages with the recess 32 in the underside of floating step 25 so as to provide a guiding surface as a floating step is lowered toward the frame. To enhance the guiding ability of the guides 28, in some embodiments the guide 28 has a vertical edge 54 with rounded corners 52 so as to promote a lead-in surface. Further, in some embodiments, the step has a recess 32 with a rounded leading edges 55. In this way, the rounded corners 52 and/or edges of the recess act to allow tolerance to misalignment of the floating step, relative to the flange, in at least the longitudinal direction.

When a floating step 25 is in the lowered position, it is vertically supported by at least the frame member 36. However, in some embodiments, the upper edge 53 of the guide 28 may also engage with the upper surface of the step recess 32 to also provide some vertical support. Further, the guide 28 has side edges 54 which engage with the sides of the recess 32 of the floating step. In this way, the side edges 54 stabilize the floating step in the longitudinal direction.

The floating step supports 28 of the first frame 11 are preferably adjacent to the floating step supports 29 of the second frame 11 but further "inboard" relative to the ends of the floating step 25. In this way, when the second frame 22 is lowered, or not at the full extension, the floating step supports 28 of the first frame 11 can coexist with the floating step supports of the second frame 22 in the recess 32 on the underside of the step 25.

Those skilled in the art will appreciate the recess 32 is one exemplary construction of a geometric shape operable to the supports 28 and 29. However, in other embodiments, the step comprises brackets, or other form factors so as to provide the desired mechanical between the step and supports.

Referring to FIGS. 16 to 18, each sidewall 50 of the second frame section 22 has mounted thereto a plurality of abutments referred to herein as floating step supports 29. In the exemplary embodiment depicted, the floating step supports 29 are pairs of spaced apart ledges which act to vertically engage with and vertically support the floating steps 25. The floating step supports 29 on one sidewall 50 are directly opposed to the floating step supports 29 on the other sidewall 50. The pairs of opposed floating step supports 29 are positioned to provide support for the respective floating steps 25 when the second frame section 22 is in a raised or extended position relative to the first frame section 11.

The pairs of ledges 29 are staggered up the sidewall 50 of the second frame section 22. Consequently, as the stairway is moved from the compacted form to the extended form, the upper most pair of floating step supports 29 will pick up a floating step 25 and following this the successive pairs of floating step supports 29 will pick up the other floating steps 25. This progressive picking up of the floating steps will result in the second frame section 22, when fully raised, having each pair of floating step supports 29 supporting a floating step 25 such as shown in FIG. 3.

To provide a stable location of the floating step 25 when engaged with and supported by the pair of floating step supports 29, each floating step support 29 preferably has a guiding surface that upwardly projects from the upper surface thereof. In exemplary embodiments, the guiding surface is shown as a vertically projecting flange 61. The flange 61 engages in the recess 32 on the underside in the floating step 25. The flanges have an upper side or edge 62 which engages with the underside of the floating step and provides vertical stability to the step 25. The flange 61 also has longitudinal sides or edges 63 which engage with the longitudinally orientated sidewalls of the recess 32 to stabilize the floating step in the longitudinal direction. However, the flange does not inhibit lateral movement of the step.

The recess 32 on the underside of the floating step is ideally elongate and orientated laterally such that neither flange 28, nor flange 29 engages laterally with the recess. In this way, the floating step supports 29 allow lateral movement of the floating step yet stabilize the step vertically and to the leading and trailing directions.

To further describe the invention reference will now be made to the stairway in operation.

When the second frame section 22 is in the compacted or lowered position (as shown in FIGS. 1 and 2) all the floating steps 25 will be supported by the frame 34. The upper surfaces 25*a* of the floating steps 25 thus lie in substantially a common plane and also lie substantially in the plane of the landing deck 23. The steps 25 thereby form an extension of the landing deck 23 and a substantially continuous surface upon which a person can walk.

When the second frame section 22 is moved upwardly by the actuator 40, the uppermost pair of ledges 29 will pick up the floating step 25 that is closest to the landing deck 23. This will raise this floating step 25 out of the plane of the other floating steps. Subsequently, the respective pairs of ledges 29 progressively pick up the second and third floating steps 25 in succession.

When the second frame section has been raised to its fully extended position, all floating steps will have been raised in turn by the respective pairs of ledges 29 so as to provide evenly spaced steps between the top fixed step 15 and the landing deck 23.

If the raising of the second frame section is stopped at any position between the fully lowered and fully raised positions floating steps 25 which have at that point been picked up will form the step(s) between the top fixed step 15 and the landing deck 23. Thus the second frame section can be raised to any adjusted height between its fully lowered and raised positions depending on the level at which the landing deck 23 is required to be located.

For further security of the floating steps each floating step 25 can be provided with cam locks which are pivotally attached to a mounting on the underside of the floating step 25. The cam lock is of a hook shape and in operation is pulled into position by gravity so that the hook end of the cam lock will engage with the underside of the ledges. This prevents accidental upwards displacement of the floating steps 25 when in the elevated position.

Thus the floating steps 25 will always remain coupled to the supporting ledges 29. Consequently the invention provides floating steps that freely move to accommodate the upward/downward movement of the second frame section 22 but always remain connected to the supporting ledges 29. This is achieved with a simple but effective construction.

The floating steps are further prevented from binding with other components during a raising or lowering operation. This advantage is achieved by the combination of the rollers 31 on the sides of the floating steps engaging with sidewalls 50 and providing substantial lateral stability to the step without substantially inhibiting vertical or longitudinal movement of the step. To stabilize the floating step vertically and from longitudinal movements, the ledge 29 engages with the underside of the floating step, and in particular engages with forward and rearward edge surfaces of the recess, and the top surface of the recess. In this way, the ledge 29 substantially stabilizes the floating step vertically and in the forward and rearward directions, and does not substantially inhibit lateral movement. The combination of the ledges 29 and rollers 31 therefore harmonize to stabilize the floating step in all directions.

The adjustable stairway of the invention thus removes the need for multiple types of stairs and ladders to provide access to a wide range and types of vehicles, machinery and equipment. Consequently a user may need only one or possibly two different sizes of adjustable stairway to achieve what previously may have required multiple ladders and stairs.

Figure 19:
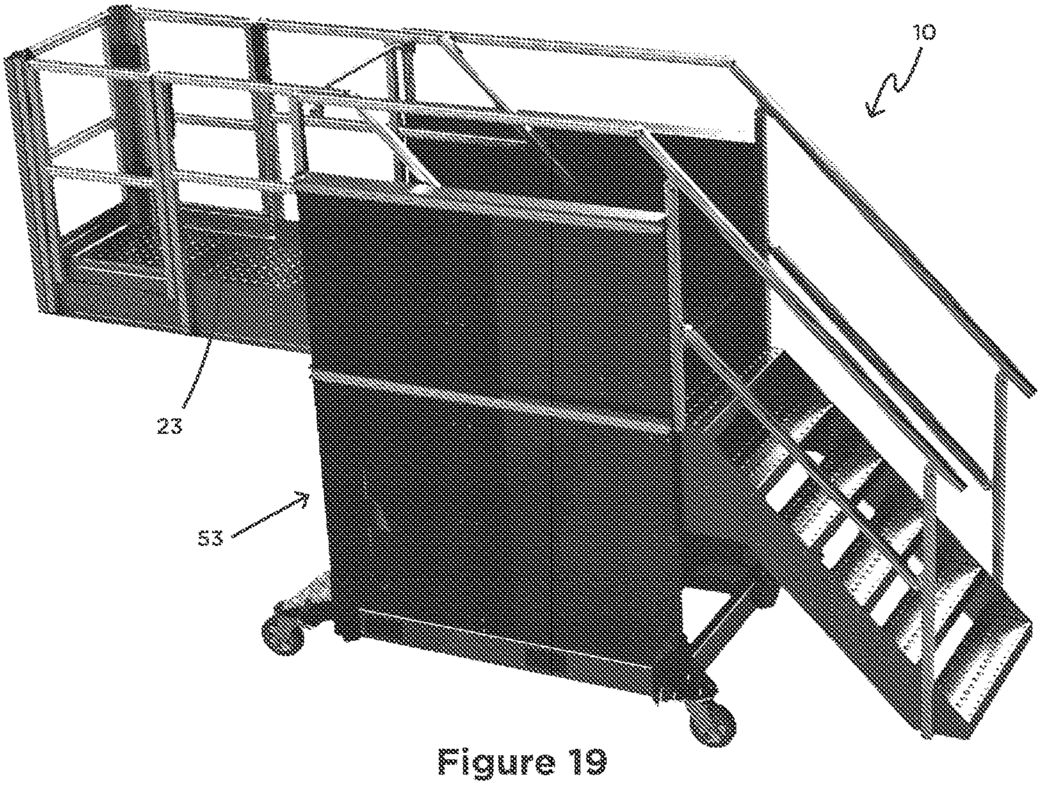
FIG. 19 shows an embodiment of the adjustable stairwell in a deployed form.
Figure 20:
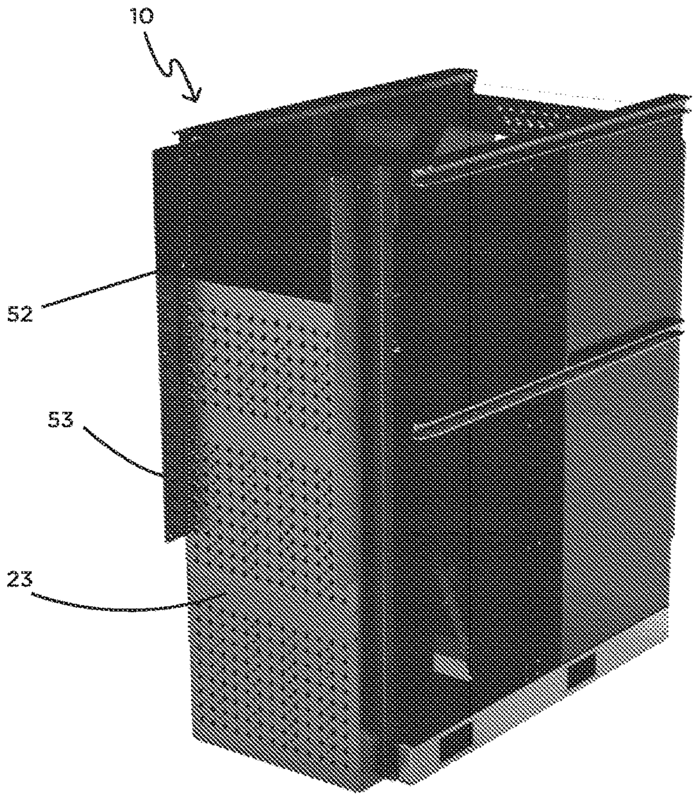
FIG. 20 shows the adjustable stairwell of FIG. 19 in a packed form.

In a preferred form of the invention the stairway can be constructed such that it can be dismantled for easy and economic transport/storage. Preferably high strength robust aluminum construction is used throughout the stairway. To this end, in some embodiments the landing deck 23 of the second frame section 22 is detachable, or pivotable relative to the sidewalls 50. FIG. 19 shows an embodiment of the adjustable stairway 10 having the landing deck 23 projecting from the forward side. FIG. 20 shows the adjustable stairway 10 in a packed configuration whereby the landing deck 23 is pivoted about an attachment 52 to align with the vertical front wall 53 of the adjustable stairwell 10. In this way, the adjustable stairway is configured to minimize its footprint which is advantageous for transportation and shipping purposes. In addition, the invention allows for the fixed portion of the stair 14 to be disassembled from the main body, and reattached in an upright manner at the rear of the unit to allow further compaction of the transportation configuration.

Although the invention has been described with reference to the preferred embodiments, it will be apparent to one skilled in the art that variations and modifications are contemplated within the spirit and scope of the invention. The drawings and description of the preferred embodiments are made by way of example rather than to limit the scope of the invention, and it is intended to cover within the spirit and scope of the invention all such changes and modifications.

What is claimed is:

1. A mobile adjustable stairway apparatus adjustable between a compacted form and an extended form, the mobile adjustable stairway apparatus comprising:

a first frame section comprising fixed steps, the first frame section adapted to be mobile; and a second frame section coupled to the first frame section, the second frame section configured to move relative to the first frame section, the second frame section comprising:

one or more floating steps;

sidewalls which form sides of a stat and which incorporate the one or more floating steps;

one or more first stabilizing components disposed between the sidewalls; and one or more second stabilizing components, wherein:

the one or more floating steps are adapted to be progressively raised and lowered as the second frame section is moved relative to the first frame section as the mobile adjustable stairway apparatus moves between the extended form and the compacted form, each floating step of the one or more floating a steps is associated with a respective first stabilizing component of the one or more first stabilizing components, each respective first stabilizing component of the one or more first stabilizing components operable to laterally stabilize each respective floating step of the one or more floating steps against the sidewalls of the second frame section, and each floating step of the one or more floating steps is associated with a respective second stabilizing component of the one or more second stabilizing components, each respective second stabilizing component of the one or more second stabilizing components operable to longitudinally stabilize each respective floating step of the one or more floating steps when the mobile adjustable stairway apparatus is in the extended form.

2. The mobile adjustable stairway apparatus of claim 1, wherein each respective first stabilizing component of the on more first stabilizing components is adapted to engage between each respective floating step of the one or more floating steps and the second frame section.

3. The mobile adjustable stairway apparatus of claim 1, wherein each respective second stabilizing component of the one or more second stabilizing components is adapted to engage between each respective floating step of the one or more floating steps and the second frame section.

4. The mobile adjustable stairway apparatus of claim 1, wherein each respective second stabilizing component of the one or more second stabilizing components is further operable to vertically stabilize each respective floating step of the one or more floating steps when the mobile adjustable stairway apparatus is in the extended form.

5. The mobile adjustable stairway apparatus of claim 1, further comprising one or more third stabilizing components, wherein:

the one or more third stabilizing components are fixed relative to the first frame section, the one or more third stabilizing components are adapted to engage between the second frame section and at least one floating step of the one or more floating steps, and the one of more third stabilizing components are operable to longitudinally stabilize the at least one floating step of the one or more floating steps when the mobile adjustable stairway apparatus is in the compacted form.

6. The mobile adjustable stairway apparatus of claim 5, wherein:

each respective second stabilizing component of the one or more second stabilizing components is laterally offset from each respective third stabilizing component of the one or more third stabilizing components, each respective third stabilizing component of the one or more third stabilizing components is more in board than each respective second stabilizing component of one or more second stabilizing components, and each respective and stabilizing component and each respective third stabilizing component longitudinally coexist such that vertical displacement of each respective second stabilizing component of the one or more second stabilizing components relative to each respective third stabilizing component of the one or more third stabilizing components is facilitated.

7. The mobile adjustable stairway apparatus of claim 5, wherein each respective third stabilizing component of the one or more third stabilizing components comprises:

a first surface aligned on a first plane defining a vertically facing surface adapted to engage with and vertically support a floating step of the one or more floating steps when the mobile adjustable stairway apparatus is in the extended form; and a second surface aligned on a second plane defining a longitudinally facing surface adapted to engage with and longitudinally support the floating step of the one or more floating steps when the mobile adjustable stairway apparatus is in the compacted form.

8. The mobile adjustable stairway apparatus of claim 1, wherein the one or more floating steps comprise at least one laterally orientated recess disposed on an underside of the one or more floating steps, the at least of laterally oriented recess adapted for engagement with at least one second stabilizing component of the one or more second stabilizing components.

9. The mobile adjustable stairway apparatus of claim 8, wherein the at least one laterally oriented recess in the one or more floating steps comprises a lead-in contour.

10. The mobile adjustable stairway apparatus of claim 1, wherein the one or more first stabilizing components comprises a pair of rollers, the pair of rollers fixed to opposing lateral regions of a floating step of the one or more floating steps and adapted to engage with the second frame section such that vertical movement is permitted and lateral movement is substantially inhibited relative to the second frame section.

11. The mobile adjustable stairway apparatus of claim 1, wherein each second stabilizing component of the one or more second stabilizing components comprises:

a first surface aligned on a first plane defining a vertically facing surface adapted to engage with and vertically support a floating step of the one or more floating steps when the mobile adjustable stairway apparatus is in the extended form; and a second surface aligned on a second plane defining a longitudinally facing surface adapted to engage with and longitudinally support the floating step of the one or more floating steps when the mobile adjustable stairway apparatus is in the extended form.

12. The mobile adjustable stairway apparatus of claim 11, wherein the second surface of each second stabilizing component of the one or more second stabilizing components comprises a lead-in contour.

13. The mobile adjustable stairway apparatus of claim 7, wherein the second surface of each third stabilizing component of the one or more third stabilizing components comprises a lead-in contour.

14. The mobile adjustable stairway apparatus of claim 1, further comprising one or more third stabilizing components, the one or more third stabilizing components positioned such that when the one or more floating steps are engaged with the one or more third stabilizing components, the one or more floating steps form a substantially flat tread surface.

15. The mobile adjustable stairway apparatus of claim 1, wherein the one or more second stabilizing components are positioned in opposing pairs, each opposing pair of the opposing pairs vertically displaced from another opposing pair of the opposing pairs such that when the one or more floating steps are engaged with an opposing pair of the opposing pairs, the one or more floating steps form a staircase.

16. The mobile adjustable stairway apparatus of claim 1, wherein the mobile adjustable stairway apparatus includes an actuator device operable to adjustably cause relative movement of the first frame section and the second frame section to occur.

* * * * *